United States Patent [19]
Kuiper

[11] 3,949,867
[45] Apr. 13, 1976

[54] DEVICE FOR CHANGING THE DIRECTION OF MOVEMENT OF AN ADVANCING ROW OF CYLINDRICAL CONTAINERS WITH RESPECT TO THEIR MAIN AXIS OF SYMMETRY

[75] Inventor: Jan Lucas Kuiper, Alphen a/d Rijn, Netherlands

[73] Assignee: Stork Amsterdam B.V., Amstelveen, Netherlands

[22] Filed: Sept. 24, 1974

[21] Appl. No.: 508,915

[30] Foreign Application Priority Data
Sept. 25, 1973 Netherlands.......................... 7313157

[52] U.S. Cl. .................... 198/271; 198/41; 198/280
[51] Int. Cl.²........................................... B65G 47/24
[58] Field of Search .......... 198/248, 249, 251, 269, 198/276, 278, 279, 280, 281, 288, 41, 271, 31 R; 221/156–159

[56] References Cited
UNITED STATES PATENTS

| | | | |
|---|---|---|---|
| 2,379,564 | 7/1945 | Cole............................... | 221/158 X |
| 3,197,013 | 7/1965 | Van Der Winden................ | 198/280 |
| 3,610,399 | 10/1971 | Friedrich ............................ | 198/288 |
| 3,710,922 | 1/1973 | Lanphere............................. | 198/288 |
| 3,782,526 | 1/1974 | Simons.............................. | 198/280 X |

FOREIGN PATENTS OR APPLICATIONS

| | | | |
|---|---|---|---|
| 453,052 | 11/1927 | Germany ............................ | 198/280 |

*Primary Examiner*—Evon C. Blunk
*Assistant Examiner*—James L. Rowland
*Attorney, Agent, or Firm*—Haseltine, Lake & Waters

[57] ABSTRACT

Device for changing the relative position of advancing consecutive cylindrical, checker-shaped containers moving in a row, the device comprising a conveyor, an inclined transport surface and a discharge path; an improvement consisting in a chute positioned at the end of the transport surface for catching those containers which did not roll down along the transport surface, the chute having a connecting conduit towards the discharge path.

1 Claim, 1 Drawing Figure

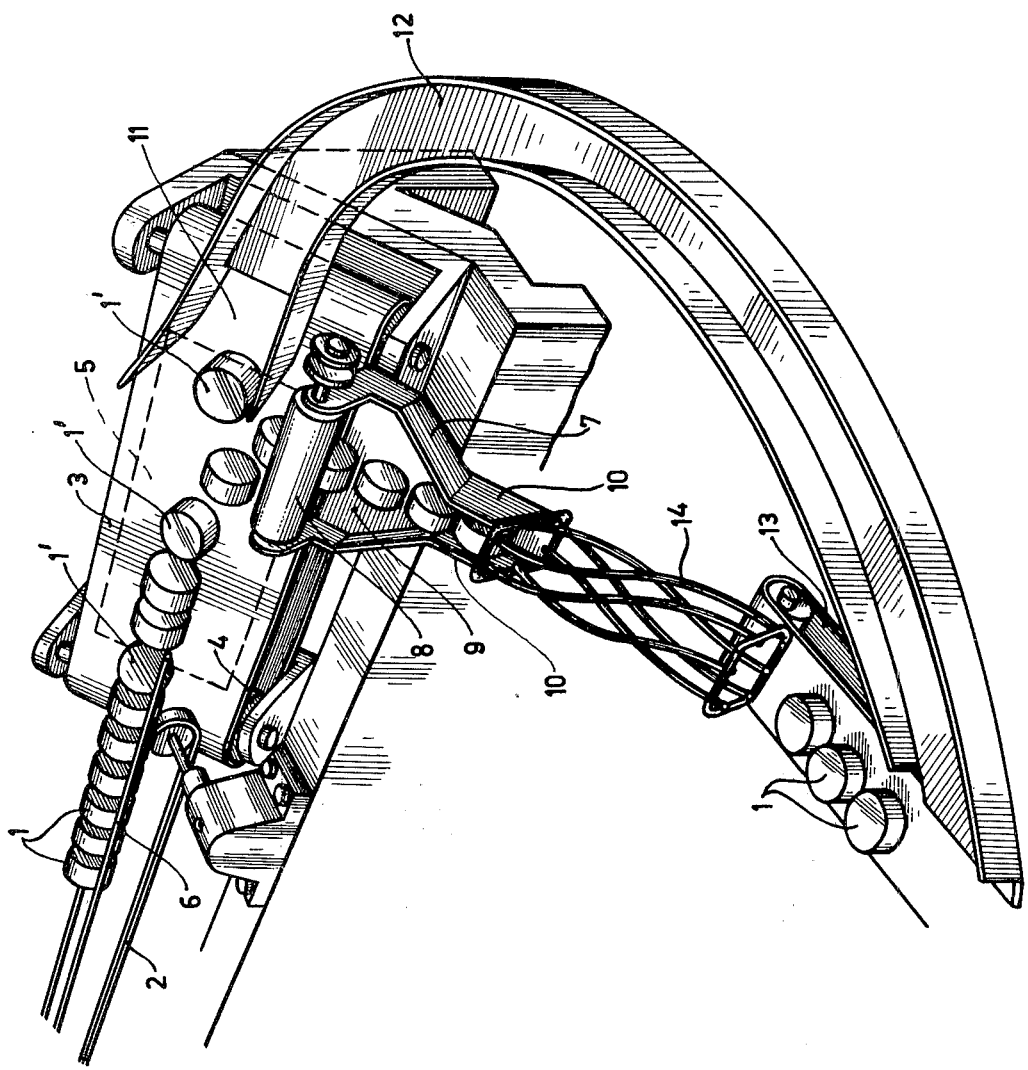

DEVICE FOR CHANGING THE DIRECTION OF MOVEMENT OF AN ADVANCING ROW OF CYLINDRICAL CONTAINERS WITH RESPECT TO THEIR MAIN AXIS OF SYMMETRY

BACKGROUND OF THE INVENTION:

The invention relates to a device for changing the direction of movement of an advancing row of cylindrical containers with respect to the main axis of symmetry, comprising a substantially horizontally extending conveyor which feeds the containers in the direction of the axis of symmetry, a transport surface adjoining the feed conveyor and likewise substantially movable in a horizontal direction, the surface being inclined in a transverse direction, a magnet disposed under the transport surface. The containers can roll downwards due to the force of gravity and can land via a winding basket in an upright position on a discharge path. Such a device is known from U.S. Pat. No. 3,197,013 issued on July 27, 1965 to VAN DER WINDEN, and relate to processing cylindrical containers of a sufficient length to avoid any tilting thereof, so that no change of direction or positioning was necessary in the previously patented device.

DISCUSSION OF THE PRIOR ART

During the change of direction described in the earlier patent the containers bear on their cylindrical side walls, while they assume a stable position because the height of the containers is in general at least equal to, but mostly greater than the diameter of the cylindrical bottoms and tops. This stable position allows to perform the change at a very fast rate.

It may occur that containers are handled with a rather small height as compared to their diameter. In this case there is question of containers shaped like checkers, made of metal. Such containers, when standing on their narrow cylindrical surfaces, tend to fall over on the inclined transport surface. As a consequence the desired change of their position then is interfered with, since then the containers are prevented from rolling down under the influence of the force of gravity.

SUMMARY OF THE INVENTION

It is an object of the invention to overcome this trouble by taking advantage of the circumstance that a fallen-over container lies flat on the inclined transport surface and as a consequence will not slide downwards. A magnet under the surface assists in preventing the container from moving downwards, so that the fallen-over containers are moved along with the transport surface.

According to the invention a catching device is provided near the end of the inclined transport surface for receiving the containers which are fallen over flat on the surface, the catching device being connected with the discharge path.

Due to this feature the fallen over containers will land flat as checkers in the catching device and will thereupon be put in the same position on the discharge path where they will assume the same position as the containers rotated about 90 degrees via the winding basket.

SURVEY OF THE DRAWING

The sole FIGURE of the accompanying drawing shows a perspective view of the device according to the invention.

DESCRIPTION OF A PREFERRED EMBODIMENT

A row of containers 1 is supplied via a conveyor 2. The relative position of the containers 1 in the row is such that the bottom of the one container is adjacent to the cover or top of the next container and vice versa. In this relative position the row of containers is treated in a sterilizer (not shown), and periodically a row of containers is discharged therefrom and put on the conveyor 2. During the further transport of the containers it is necessary that the relative position in the row is changed or rotated in such a way that the cylindrical surfaces of juxtaposed containers are adjacent to each other. The advance movement of the containers 1 in a direction perpendicular to bottoms and tops is changed to a movement parallel to these bottoms and tops.

For that purpose a movable surface 3 is provided, consisting of an endless belt which is guided over two rollers 4, one of which is driven. Each point of this surface 3 moves along a substantially horizontal path, but in the transverse direction this surface is inclined at an angle of about 45° with respect to the horizontal plane. The surface 3 adjoins the conveyor 2, the velocity of the two devices being substantially equal.

Under the surface 3 a stationary magnetic device 5 is positioned of a power such that the magnetic force field is distinctly noticeable on the front or top side of the belt surface 3. Near the lower side of the row of containers 1 a supporting member 6 is arranged for the containers. This supporting member extends into and along a small part of the surface 3 at the beginning thereof. Finally means 7 are provided for reducing to zero the original feed rate of the containers 1. These means consist of a rotatable roller 8 and a plate 9 which together with side walls 10 constitute an inclined discharge gutter for the containers 1. At that moment the containers have already changed their position with respect to the row supplied on and from the conveyor 2. The distance from the surface of the covering of the roller 8 to the plate 9 is slightly smaller than the diameter of the containers 1.

Near the end, that is to say in the drawing on the right-hand side of the inclined transport surface 3, a catching device 11 is arranged. This device consists of a chute with a rectangular cross section, the far end of the chute adjoining the movable surface 3. The catching device 11 has a gutter-shaped connection 12 leading to a discharge belt or path 13.

The effect of the transportion device is in conformity with the contents of the aforementioned earlier U.S. Pat. No. 3,197,013. The containers 1 supplied via the conveyor 2 are supported by the surface 3 when they leave the conveyor. As soon as the foremost container is clear of the supporting member 6 this container will start rolling down due to the force of gravity. As the surface 3 has the same velocity as the conveyor 2 the containers 1 maintain their linear velocity in the axial direction after leaving the conveyor.

The position of the roller 8 is such that a container 1 can only come into contact therewith when this container — as seen in axial direction — is entirely clear of the container following it. The axial component of velocity of the container concerned is reduced to zero, and this container rolls subsequently into the gutter 9, 10 and thence in a winding basket 14 in order to land eventually flat on the discharge path 13.

Since the handled containers have a diameter greater than their height, they stand on the feed conveyor 2 in an unstable equilibrium on their side walls. Experience shows that in case of a shock, as when the machine is started, one or more containers may fall over. Such a situation is also shown in the drawing. A fallen-over container 1' will not roll down along the inclined surface 3. In case it is a checker-shaped container it will also be retained at a fixed location on the surface 3 due to the presence of the magnet 5. In this way the fallen-over containers 1' are conveyed to the catching device 11, and delivered via the connection 12 to the discharge path 13.

What I claim is:

1. A device for changing the relative orientation of a row of successively advancing cylindrical, checker-shaped containers with respect to their main axis of symmetry, comprising:
   a. a substantially horizontally extending conveyor to feed the containers successively in an initial edgewise attitude, with a somewhat unstable equilibrium, in a lengthwise feeding direction that substantially coincides with the axis of symmetry;
   b. a transport surface adjoining said conveyor and movable away therefrom in the feeding direction, having an elongated operative area as well as proximate and distant ends with respect to said conveyor, and being angularly inclined with respect to the feeding direction;
   c. stationary magnet means disposed under said transport surface, for exerting a magnetic force on a plurality of the containers over a range that is smaller than said operative area of the transport surface; the magnetic force being sufficient to maintain the containers on said surface in the edgewise attitude while allowing them to roll down about their axes of symmetry along said surface under the action of gravity; the magnetic force holding some containers that are fallen over in an upright attitude which is perpendicular to the initial edgewise attitude, flat against said transport surface, with the axis of symmetry perpendicular to the latter;
   d. a winding basket having inlet and outlet ends, said inlet end being above said distant end of the transport surface, for receiving the plurality of containers in the initial edgewise attitude, said basket being angularly supported with respect to the feeding direction;
   e. a discharge path substantially lengthwise aligned with said outlet end of the basket, which end is distant from said transport surface;
   f. a catching device in the form of a chute with a substantially rectangular cross-section, having inlet and outlet ends, the former at least partly rectilinearly ajoining said distant end of the transport surface, for receiving the some containers in the upright, flat attitude, while said outlet end meets said discharge path; and
   g. a connection between said outlet end of the chute and said discharge path;
   whereby the plurality of containers in the edgewise attitude roll down on said transport surface under the action of gravity, at least partly outside the range of said magnet means, pass through said basket and land in an upright position on said discharge path, the latter position being identical with the upright, flat attitude; while the some containers that were held by said magnet means flat against said transport surface eventually enter said inlet end of the chute to reach said discharge path by the intermediary of said chute and said connection, similarly in the upright position, without change in their attitude, to be intermixed along said discharge path with the plurality of containers.

* * * * *